United States Patent [19]
Mizuno

[11] Patent Number: 5,524,247
[45] Date of Patent: Jun. 4, 1996

[54] SYSTEM FOR SCHEDULING PROGRAMMING UNITS TO A RESOURCE BASED ON STATUS VARIABLES INDICATING A LOCK OR LOCK-WAIT STATE THEREOF

[75] Inventor: Satoshi Mizuno, Urayasu, Japan

[73] Assignee: Kabushiki Kaisha Toshiba, Kawasaki, Japan

[21] Appl. No.: 11,142

[22] Filed: Jan. 29, 1993

[30] Foreign Application Priority Data

Jan. 30, 1992 [JP] Japan ................................. 4-015120

[51] Int. Cl.⁶ ..................................................... G06F 9/00
[52] U.S. Cl. ...................... 395/726; 395/650; 364/134; 364/281.3; 364/281.8; 364/DIG. 1
[58] Field of Search ................................. 395/375, 650, 395/726; 364/134

[56] References Cited

U.S. PATENT DOCUMENTS

| | | | |
|---|---|---|---|
| 4,802,164 | 1/1989 | Fukuoka et al. | 371/16 |
| 4,989,133 | 1/1991 | May et al. | 364/200 |
| 5,179,702 | 1/1993 | Spix et al. | 395/650 |
| 5,274,809 | 12/1993 | Iwasaki et al. | 395/650 |
| 5,377,352 | 12/1994 | Tanaka et al. | 395/650 |

OTHER PUBLICATIONS

Maurice J. Back: "UNIX Kernl Design" 1986 ISBN4–320–02551–2 C3041.

Primary Examiner—Thomas C. Lee
Assistant Examiner—Sang Hui Kim
Attorney, Agent, or Firm—Cushman, Darby & Cushman

[57] ABSTRACT

A computer system comprising a CPU and a scheduler. The CPU sets a predetermined value in the status variable corresponding to a thread when the thread starts waiting for a resource which it shares with other threads. The scheduler refers to the status variable, selects, with priority, a thread other than the thread waiting for the shared resource, and allocates the CPU to the thread thus selected.

6 Claims, 15 Drawing Sheets

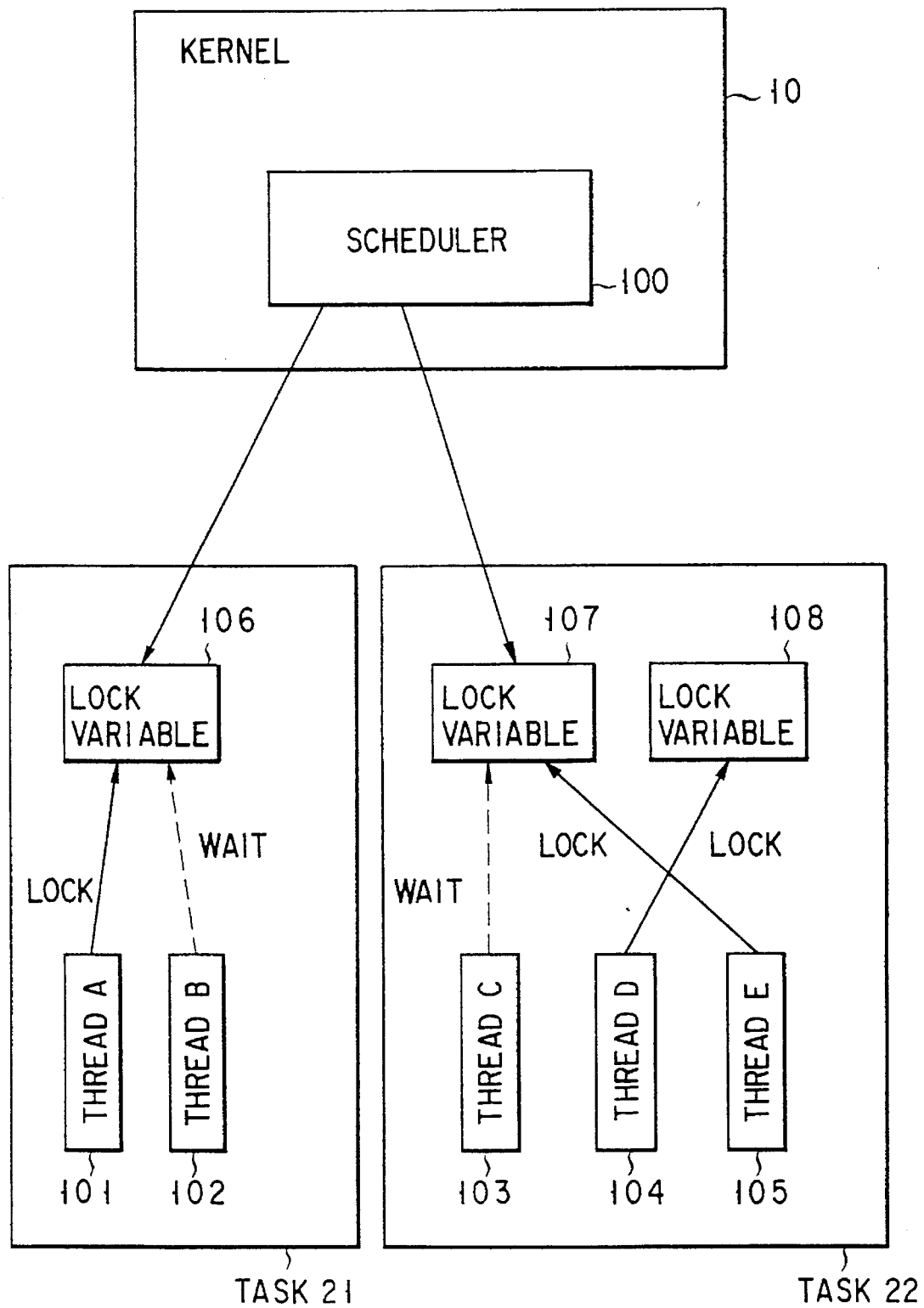
F I G. 1

| NAME OF THREAD | ADDRESS OF STATUS VALIABLES |
|---|---|
| THREAD 0 | &status[0] |
| THREAD 1 | &status[1] |
| ⋮ | ⋮ |
| THREAD 9 | &status[9] |

```
while (1) {
    if (L1 == OK) {
        status [i] = 0;
        if (tas(&L1)==OK)
            break;
    }
    status [i] = &L1;
}
```

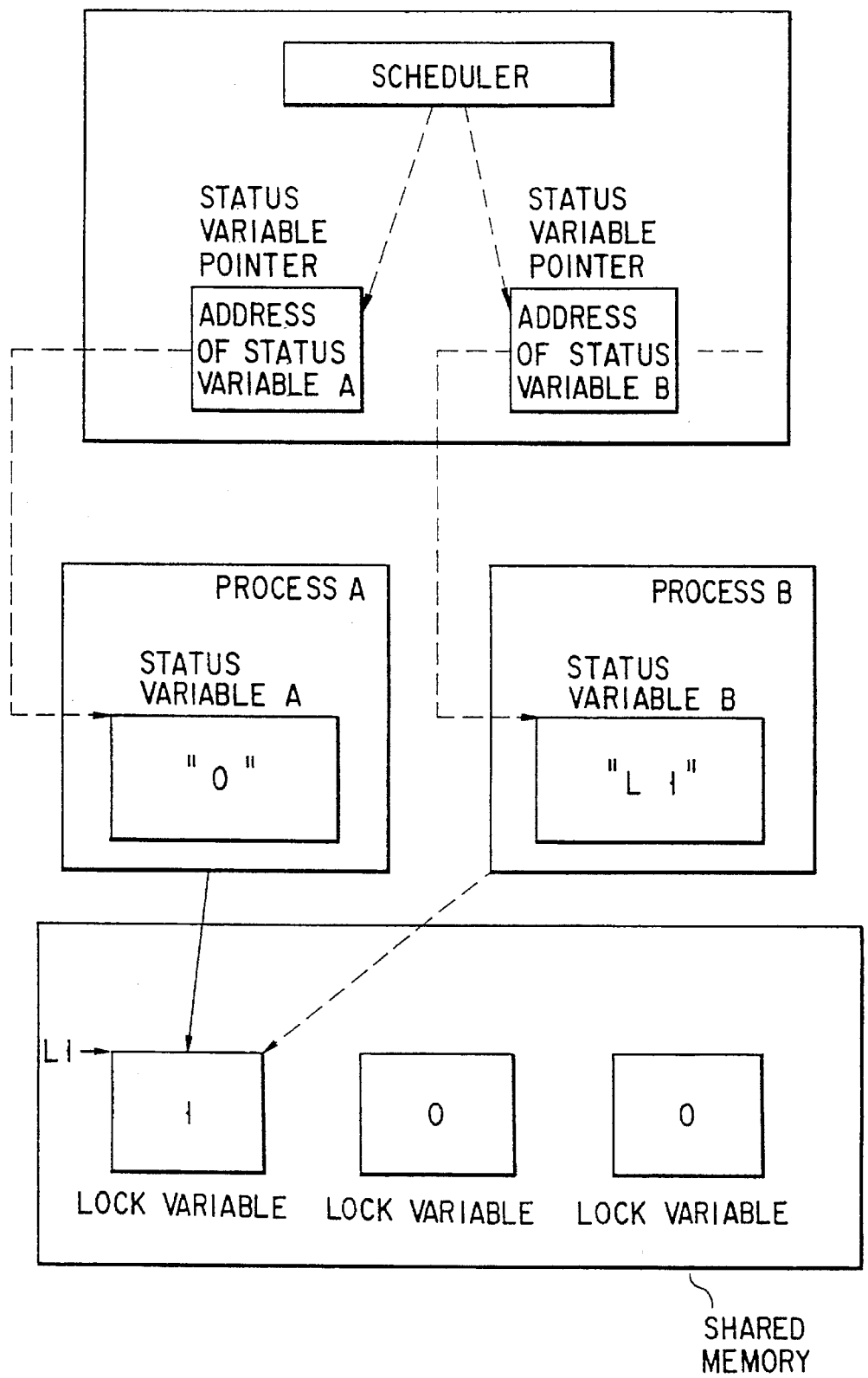
F I G. 11

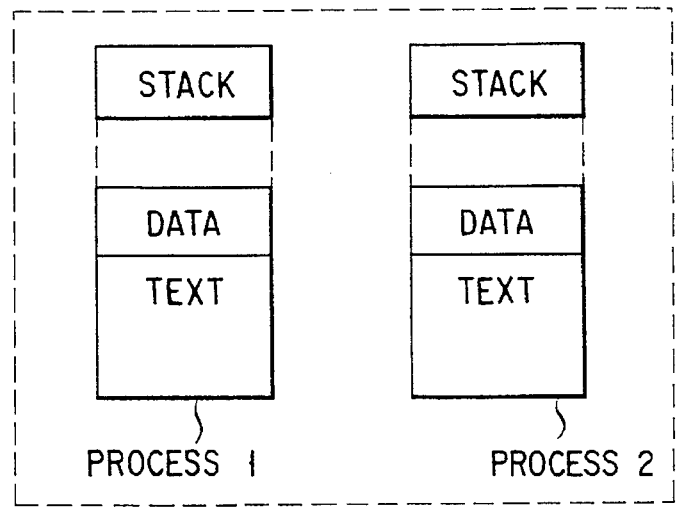
F I G. 12
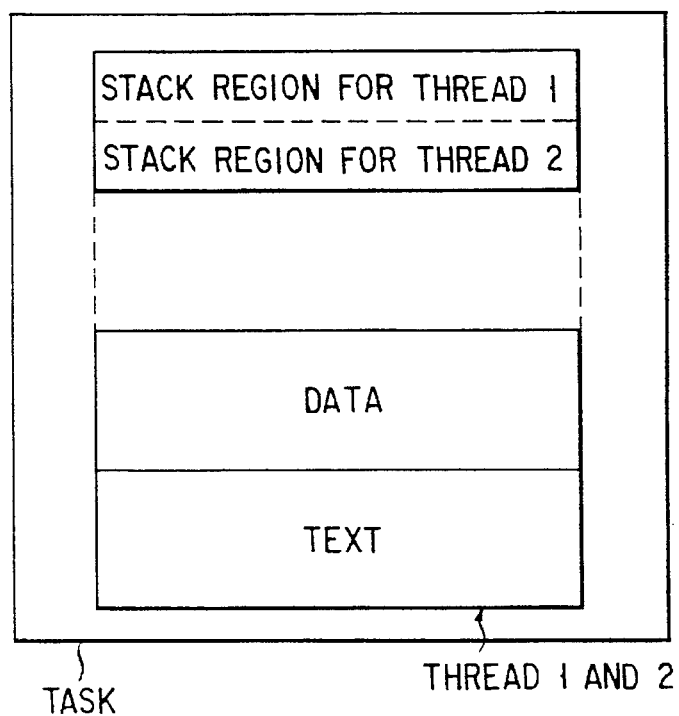
F I G. 13

SYSTEM FOR SCHEDULING PROGRAMMING UNITS TO A RESOURCE BASED ON STATUS VARIABLES INDICATING A LOCK OR LOCK-WAIT STATE THEREOF

BACKGROUND OF THE INVENTION

1. Field of the Invention

The present invention relates to a scheduler for use in a computer system and also to a scheduling method, and more particularly to a scheduler and a scheduling method in a computer system, in which mutual exclusion of threads or processes is achieved by the use of a shared variable.

2. Description of the Related Art

In a conventional computer system, scheduling is effected such that the CPU time is allocated to processes or users as uniformly as possible. When the conventional scheduling method is applied to parallel programming, a representative example of which is thread programming, the programming cannot be accomplished with high efficiency.

This problem will be described in detail, with reference to FIG. 12 representing the memory space of process which is controlled by a typical conventional operating system (e.g., UNIX operating system). As is shown in FIG. 12, processes 1 and 2 have a text space, a data space, and a stack space each. One of the process cannot refer to any memory space controlled by the other process. Communications between the processes 1 and 2 and the exclusion control thereof are effected by using system calls. The conventional operating system has a large overhead. Hence, it is difficult to prepare such a program as would make a plurality of processors cooperate to perform one processing with high efficiency.

What has been devised to solve this problem is thread programming. FIG. 13 illustrates the memory space for thread programming. A plurality of threads can share a text space, a data space, and a stack space. The threads can, therefore, achieve mutual communications and exclusion control, without using system calls, by the use of variables shared in their memory spaces. In view of this, the thread programming is suitable for a multi-processor system. The threads which shares memory spaces are called a "task" collectively.

A method has been proposed in which a plurality of processes share a memory space as is illustrated in FIG. 14. A shared memory is a special data space which a plurality of processes have in common, and is utilized to accomplish communications between the processes or synchronization of processes.

In thread programming of ordinary type, a variable shared by a plurality of threads is used to achieve exclusion control of threads. Such a shared variable is called a "lock variable." The lock variable is used such that when the lock variable is, for example, "1" one of the threads uses a shared resource exclusively, and any other threads cannot use the shared resource to perform processing.

FIG. 15 schematically shows the thread 3 of task 1 which is exclusively using a shared resource corresponding to a lock variable S (held in lock state). FIG. 15 also shows the other threads 1, 2 and 4 of the task 1 which are waiting for the release of the shared resource (held in lock-wait state).

FIG. 16 is a flow chart explaining how exclusion control (or synchronization control) is carried out, using a lock variable S.

In step S1, a thread reads the lock variable S corresponding to the shared resource in order to perform processing by using a shared resource. In step S2 it is determined whether the value for the lock variable S is "0" or not. If Yes, the flow goes to step S3, in which the lock variable S is rewritten to "1." Then, the thread performs processing via exclusive control of the shared resource. In step S4, upon completion of the processing, the lock variable is rewritten to "0" allowing any other thread to use the shared resource in order to perform processing.

If No in step S2, that is, if the lock variable S is found to have the value of "1" steps S1 and 2 are repeated until the lock variable S acquires the value of "0". The thread remains in so-called "busy-wait state" or "spin-loop state" until the variable S becomes "0".

Steps 1 to 3, i.e., retrieval and up-dating of the lock variable S, need to be executed indivisibly, as test & set instruction should be. Hence, a processor instruction executed to acquire the shared source is basically a single machine instruction.

The use of the lock variable makes it possible to accomplish mutual exclusion of threads, both easily and reliably. In this method, however, the processing efficiency may degrade in some cases where a plurality of threads undergoes frequent mutual exclusion.

In an operating system of ordinary type, for example, a thread is made to stop processing when a predetermined time (i.e., time quantum) elapses or when the processing becomes no longer possible due to I/O waiting or the like, and scheduling is then performed.

Let us assume that the operating system selects the next thread to execute, in the condition illustrated in FIG. 15. Let us also assume that threads 1 to 4 of task 1, thread X of task 2, and threads Y and Z of task 3 have equivalent priority and that they are each executable. In this case, a scheduler can select any one of the threads 1 to 4, but the processing efficiency will greatly differ in accordance with the method of selecting the next thread to execute.

If the system is a single-processor system (having only one CPU), and threads 1, 2 or 4 are selected, the CPU will undergo spin-looping since these threads remain in the lock-wait state, this reducing processing efficiency. If the thread 3 is selected, however, the CPU can perform processing immediately, and the other threads 1, 2 and 4 can start processing the moment the thread 3 finishes processing. In this case, the processing efficiency is high. The CPU is efficiently used when the threads X, Y and Z of the tasks 2 and 3 are executed, as well.

In summary, in the single-processor system, (1) the selecting of a thread in the lock-wait state (i.e., a thread waiting for the release of the shared resource) wastes the CPU time, and (2) the selection of a thread in the lock state (i.e., a thread locking the shared resource) or a thread which need not be set in the lock state can make an effective use of the CPU time. A conventional scheduler cannot determine whether or not a thread is in the lock-wait state. Hence, in some cases, the scheduler may select a thread remaining in the lock-wait state.

FIG. 17 is a diagram representing how the CPU of the single-processor system operates in the case where it takes each thread to complete the execution that must be done exclusively about 1.5 times T, the unit time quantum T. In FIG. 17 the thread 3 locks the shared resource between time t0 and time t1. In this instance, the CPU is sequentially assigned to the threads 1, 2, and 4, each in the lock-wait state during the period between time t1 and t4. Accordingly, it will be used for nothing due to the spin looping. When the thread 3 releases the shared resource at time between t4 and t5, the thread 1 can secure the shared resource for itself during the executing time T elapsing from t5. In the case shown in FIG. 17, the activity ratio of the CPU is 0.5 or less, and the processing efficiency is low.

In a multi-processor system, as well, the same problem will arise. FIG. 18 is diagram explaining the case where threads are sequentially executed with a low efficiency in a multi-processor system which has four CPUs. In this instance, the threads 1, 2, and 4, each remaining in lock-wait state, keeps on spin-looping until the the thread 3 releases the shared resource, and the activity ratio of each CPU is 0.5 or less, too. Obviously, the processing efficiency is low.

The cases explained with reference to FIGS. 17 and 18, respectively, are two of the worst cases. However, phenomena similar to these actually occur in the conventional operating system which employs round robin scheduling.

The scheduling problem explained above arise also when the processes shown in FIG. 14 use the shared variable to achieve mutual exclusion.

SUMMARY OF THE INVENTION

The present invention was made for the purpose of solving the problems described above. An object of the invention is to provide a computer and a data-processing method, in which a CPU can be used with an increased efficiency.

Another object of the invention is to provide a computer or a data-processing method, using a scheduler or a scheduling method in which it is determined whether a thread or a process is in lock-wait state or not, and which can perform scheduling with the highest possible efficiency.

A computer according to the invention comprises:

means for determining whether each of plurality of program units to execute is in lock-wait state; and scheduling means for allocating, with priority, a CPU to the program unit in any state other than the lock-wait state.

A data-processing method according to the present invention comprises:

a scheduling step of selecting at least one of a plurality of program units forming a program; and program-executing step of executing said at least one of the program units which has been selected in the scheduling step, wherein the program-executing step includes a step of setting predetermined data when the selected program unit starts waiting for a resource shared by the program unit, and the scheduling step includes a step of selecting, with priority, any program unit other than the program unit which is waiting for the shared resource, in accordance with the predetermined data.

In the computer and the data-processing method of this invention, any program unit not in the lock-wait state is selected with priority. The time spent in spin looping is short, thus increasing the use efficiency of the processor incorporated in the computer or utilized in the method.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a diagram explaining scheduling according to an embodiment of the present invention;

FIG. 11 is a block diagram showing an operating system according to a second embodiment of the present invention;

FIG. 12 is a schematic representation of the memory space of an ordinary process;

FIG. 13 is a schematic representation of the memory space of a ordinary thread;

DETAILED DESCRIPTION OF THE PREFERRED EMBODIMENTS

An embodiment of the invention will be described, with reference to the accompanying drawings.

First, the principle of scheduling according to the embodiment will be explained, with reference to FIG. 1.

To perform scheduling, a scheduler 100 existing in the kernel 10 of an operating system refers to lock variables 106, 107, and 108, thereby to determine whether threads A to E to which CPUs are (to be allocated) are in lock-wait (lock-waiting) state or not. The scheduler 100 selects, with priority, the threads which are in lock-wait state or which need not be set in lock state, and allocates the CPUs to these threads. FIG. 1 illustrates the case where the threads A, D, and E are in lock state, and the threads B and C are in lock-wait state. In the next executing time T, the scheduler 100 selects the threads A, D, and E and allocates the CPUs to the threads selected. The CPUs therefore waste no time in spin looping, accomplishing high-efficient data processing.

Figure 2:
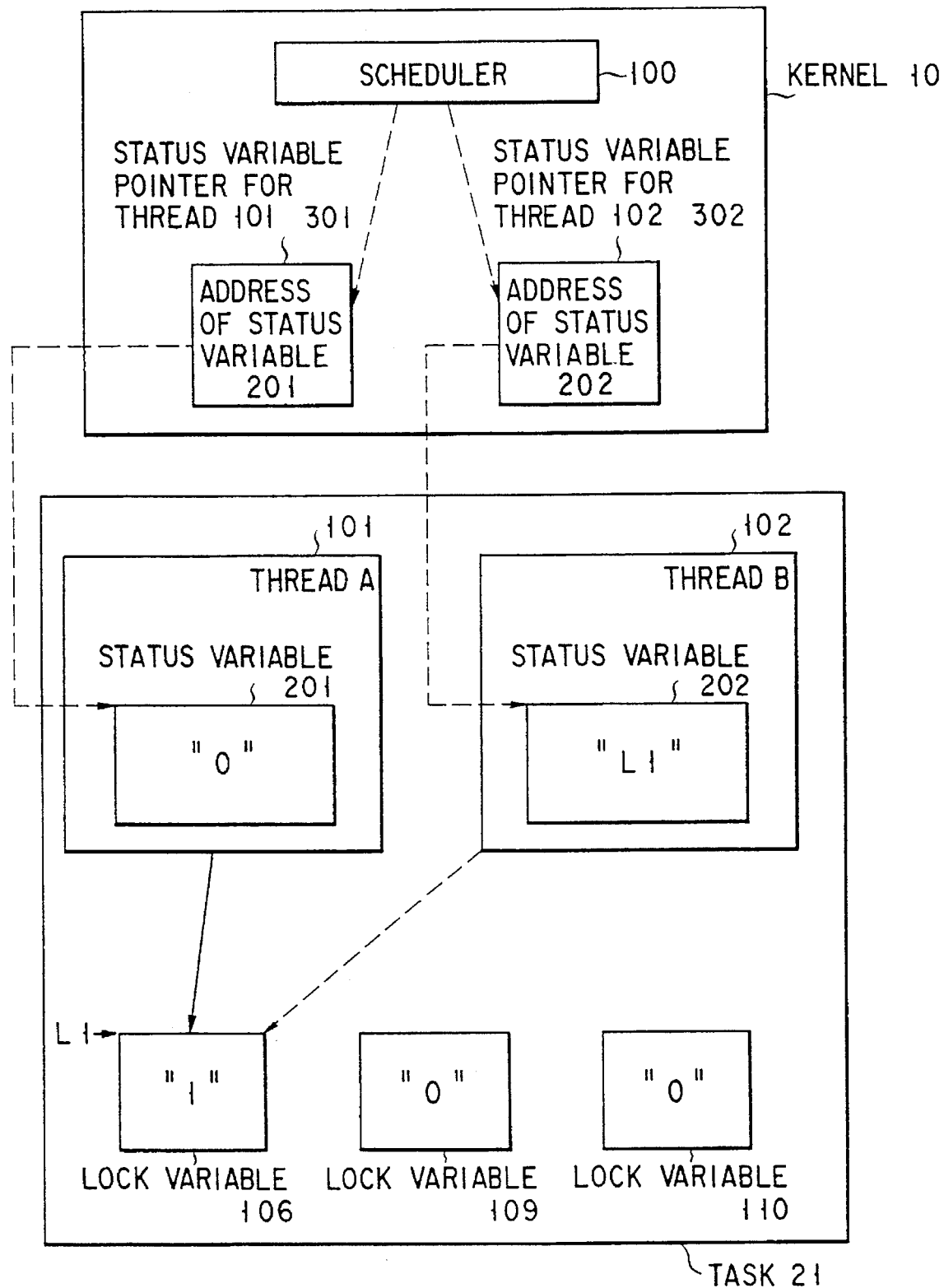
FIG. 2 is a diagram representing the operating system and task incorporated in a computer system according to the embodiment of the invention.

FIG. 2 shows an operating system and a task which the scheduler 100 employs to refer to lock variables. The configuration of FIG. 2 includes status variables and status variable pointers.

A "status variable" is a variable existing in a task space and assigned to one thread. It is statically declared in the thread space and assumes the address of the corresponding lock variable when the associated thread enters into lock-wait state. The status variable takes the value of "0" when the thread is not in lock-wait state. Hence, it is assumed that the address of the lock variable is of a value other than "0."

A "status variable pointer" is a pointer existing in the space of the kernel 10 and assigned to one thread. Each thread sets the address of its own status variable in the status variable pointer. In this embodiment, a specific system call "a status_variable_ declare ()" (later described) is provided to set the address of the status variable in the status variable pointer.

As FIG. 2 shows, the threads A and B exist in a task 21. The thread A locks a lock variable 106. (Namely, the thread A locks the shared resource associated with the lock variable 106.) The thread B remains in lock-wait state, waiting for the lock variable 106 which will be released from the thread A. (In other words, the thread B is waiting for the shared resource associated with the lock variable 106.) There are no threads which lock lock variables 109 or 110. Thus, "1" is set in the lock variable 106, and "0" is maintained at the clock variables 109 and 110. The value "0" is set in status variable 201 for the thread A, and the address L1 of the lock variable 106 is set in 10 the status variable 202 of the thread B.

Existing in the kernel 10 are: the scheduler 100, a lock variable pointer 301 for a thread 101, and a lock variable pointer 302 for a thread 102. The address of the status variable 201 is set in the status variable pointer 301, and the address of the status variable 202 is set in the status variable pointer 302.

Figure 3:
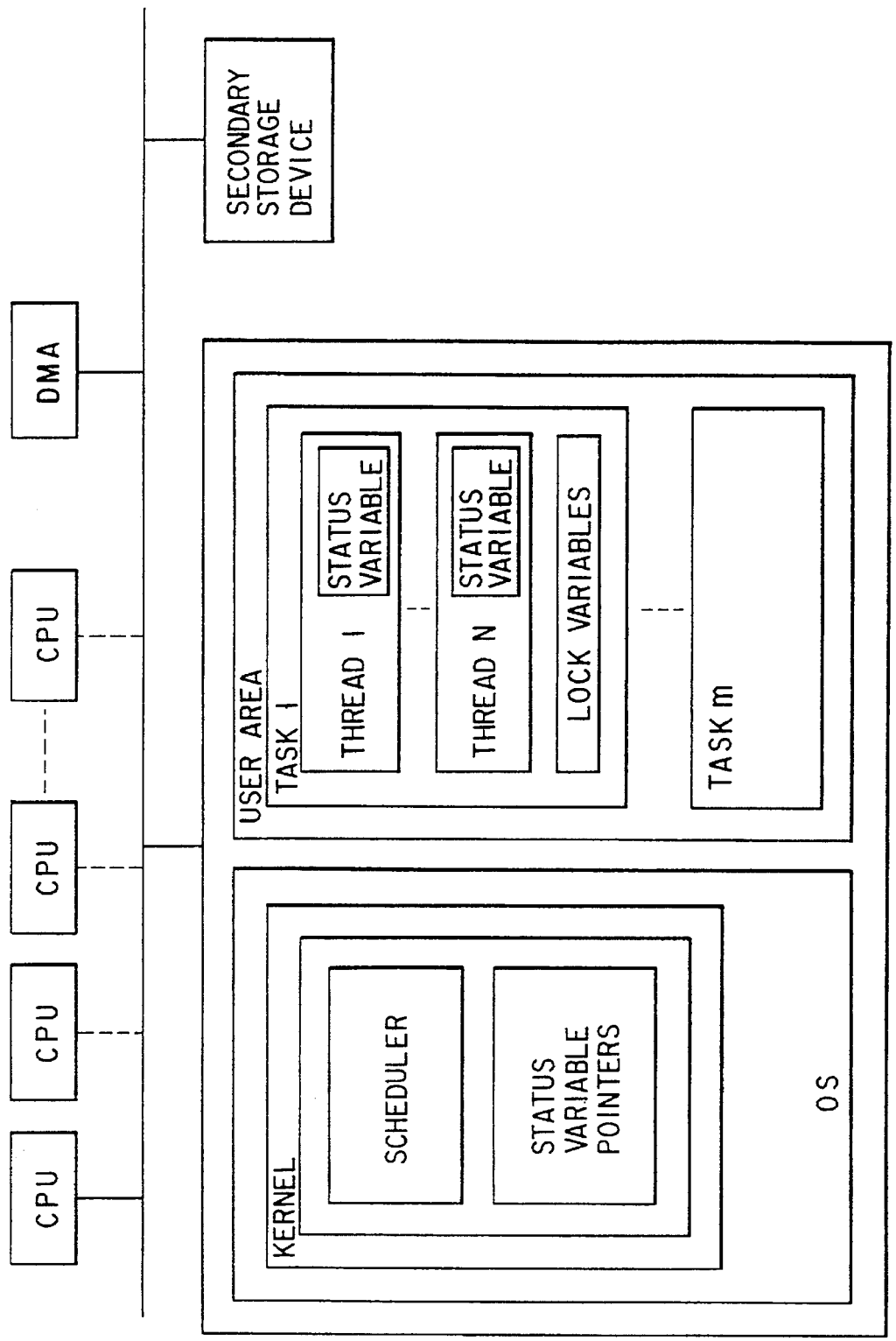
FIG. 3 is a block diagram showing the hardware of the computer system.

The hardware of a computer system which realizes the configuration of FIG. 2 is illustrating FIG. 3. As is seen in FIG. 3, the CPUs are connected to a main memory by a bus. The main memory has an OS area and a user area. The OS area is used for storing the operating system (OS). The user area has regions, each for storing the threads and lock variables pertaining to one task, and also regions, each for storing the status variables pertaining to one thread.

Declaration and initialization of the status variables, and the registering of the status variable pointers will be explained, with reference to the C-language flow chart of FIG. 4. Here it is assumed that 10 threads are available and that 10 status variables exist.

First, in step S11, "long int status [10];" the status variables 0 to 9 are declared in the form of an array. Next, in step S12, the status variable [i] is initialized to "0." The status variable for the thread 0 corresponds to "status [0]," the status variable for the thread 1 corresponds to "status [1]," and so forth. Thus, the status variable for the thread 9 corresponds to "status [9]." In step S13, the addresses of the status variables are sent to the kernel 10 by means of system call, "status_variable_declare ()," and are set in a status variable pointer.

Figures 4, 5:
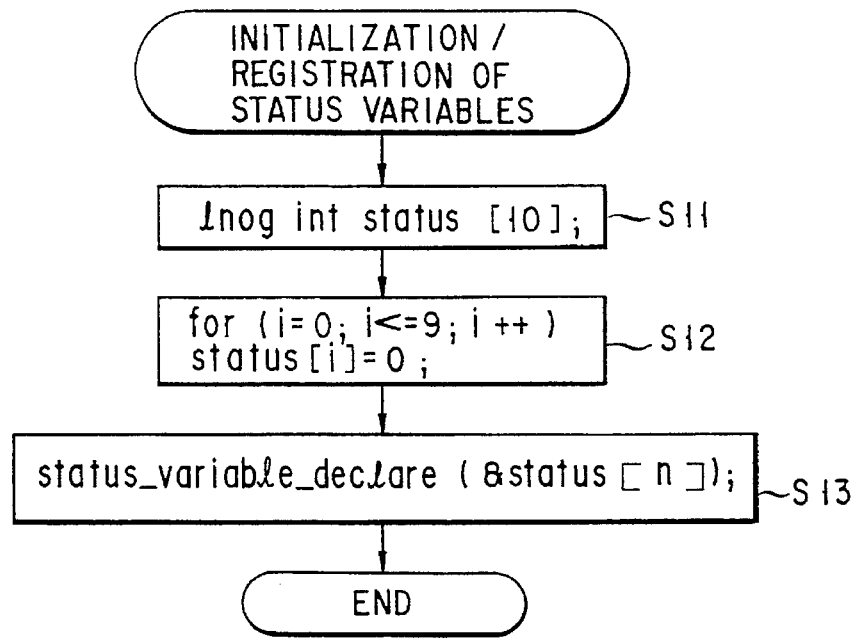
FIG. 4 is a flow chart explaining how to initialize status variables and register them in a kernel in the computer system.
FIG. 5 is a table showing the correspondence between the threads controlled by a scheduler and status variables.

As a result, a table shown in FIG. 5 is formed in the kernel 10 which shows the correspondence between the ten threads 0 to 9, on the one hand, and the addresses "&status [0]" to "&status [9]" of the status variables for the threads, on the other hand. This table functions as a status variable pointer.

How each of the threads shown in FIG. 2 locks a shared resource will now be explained, with reference to the flow chart of FIG. 6. FIG. 7 is a program of the C-language for realizing the flow chart shown in FIG. 6, in which the value OK (=0) indicates that the lock variable 106 at the address L1 is not locked, and the notation of "tas ()" is a function used to achieve "test & set." When the result obtained by executing this function is "OK," it means that a lock variable designated by an argument has been acquired.

Figure 6:
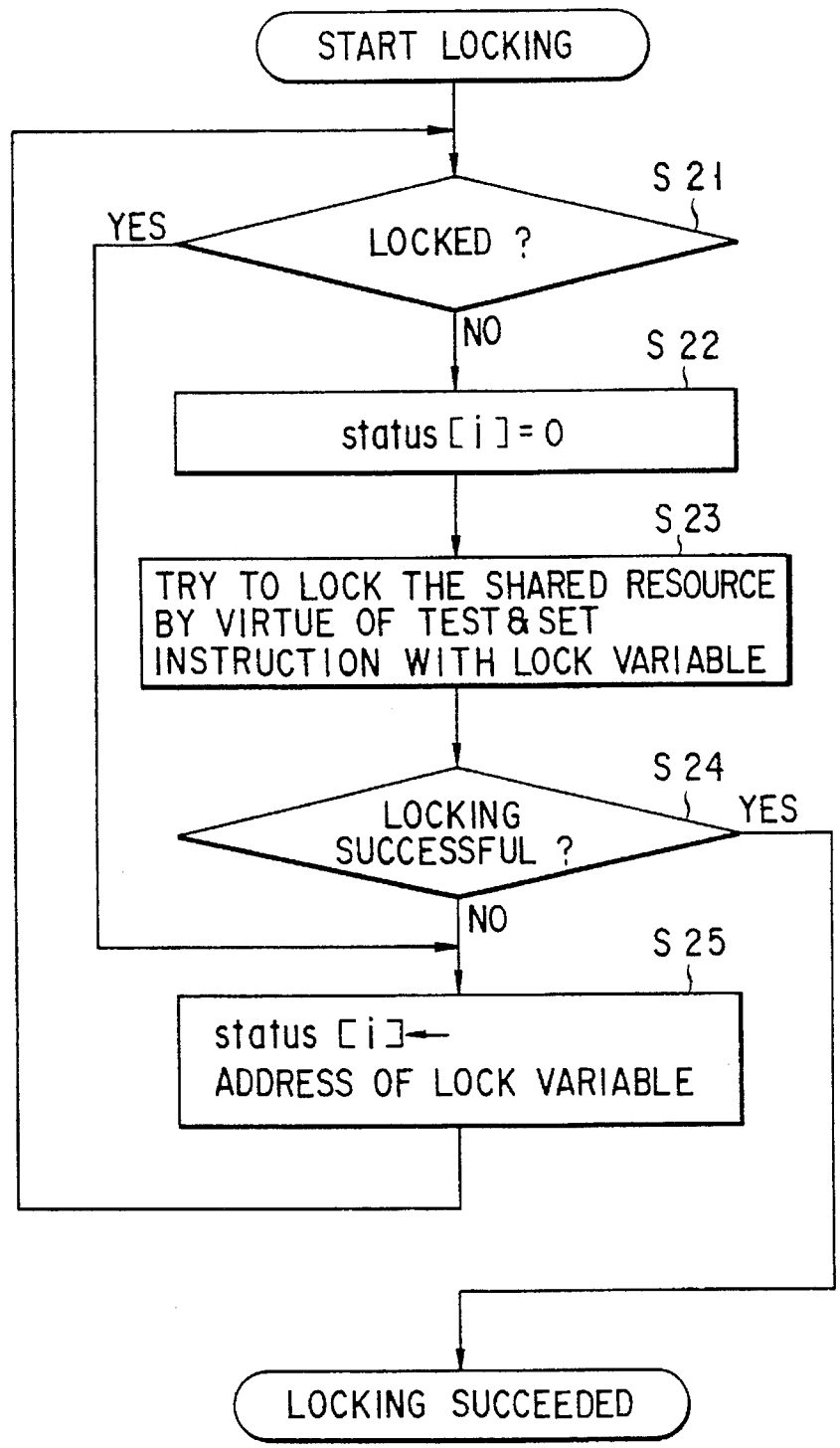
FIG. 6 is a flow chart explaining how threads lock a shared resource.
Figures 7, 14:
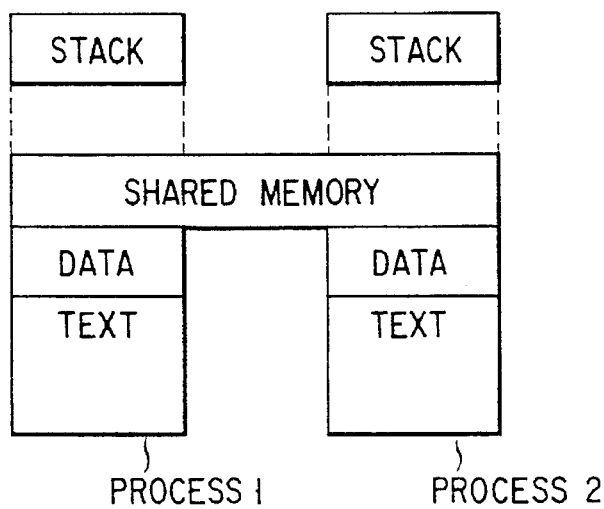
FIG. 7 is a C-language version of the flow chart shown in FIG. 6.
FIG. 14 is a schematic representation of the memory space of a process having a shared memory.

As can be understood from the flow chart of FIG. 6, any thread requiring the shared resource determines, in step S21, whether or not the shared resource is locked by any other thread. If Yes, that is, if the lock variable is "1," the flow jumps to step S25, in which the address of the lock variable is set in the corresponding status variable. Then, the flow returns to step S21, whereby a spin-looping is initiated.

If No in step S21, that is, if the lock variable is "0," the flow goes to step S22, in which the value "0" is set in the status variable of the thread. Next, in step S23, the thread tries to obtain the shared resource by virtue of a test & set instruction or the like. In step S24, it is determined whether or not the shared resource has been successfully obtained. If Yes in step S24, the thread exclusively performs processing, using the shared resource it has just acquired.

If No in step S24, that is, if it is determined that the shared resource has not been obtained, the flow goes to step S25. In step S25, the address of the lock variable checked is set in the corresponding status variable. Thereafter, the flow returns to step S21, and a spin-looping is thereby initiated.

More specifically, let us assume that, in the configuration of FIG. 2, the thread 101 checks the lock variable 106 in order to acquire a shared resource, and finds that the variable 106 has the value of "0." In this case, the flow advances from step S21 to step S22. In step S22, the value "0" is set in the status variable 201. Then, in step S23, the thread 101 tries to obtain the shared resource by virtue of a test & set instruction and obtains it. This fact is confirmed in step S24. Thereafter, the thread 101 is executed, exclusively using the shared resource.

Assuming that the thread 102 needs to acquire the shared resource in this condition, the flow jumps from step S21 to step S25 since the lock variable 106 has the value of "1." In step S25, the address "&L1" of the lock variable 106 is set in the status variable 202. The flow then returns to step S21, and a spin-looping is initiated. As a result, the condition indicated in FIG. 2 is established.

Figure 8:
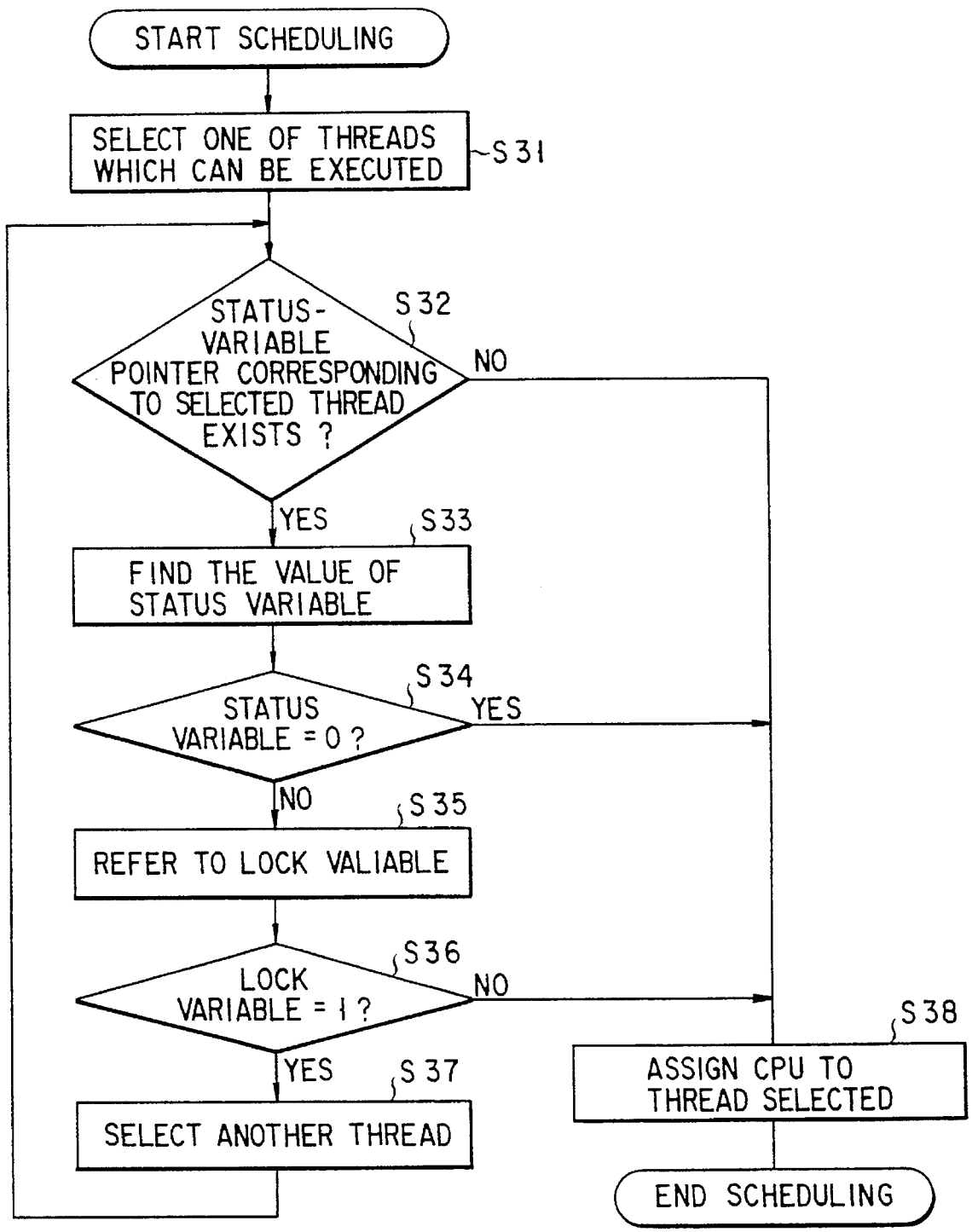
FIG. 8 is a flow chart explaining how scheduling is performed in the embodiment of the invention.

The scheduling procedure will now be described, with reference to the flow chart of FIG. 8.

First, in step S31, the scheduler 100 selects the thread having the highest priority. For instance, the scheduler 100 selects one of the threads set in a queue based on their priorities.

Next, in step S32, the scheduler 100 determines whether or not the status-variable pointer for the thread selected is registered in the space of the kernel 10. If No, the flow jumps to step S38. In step 38, the CPU is assigned to the thread selected in step S31. This is because, the thread does not utilize a lock variable, thus it cannot be in lock-wait state, unless its status-variable pointer is registered in the kernel 10.

If Yes in step S32, that is, if the status-variable pointer for the thread is registered in the kernel 10, the flow goes to step S33 so that it may ultimately be determined whether or not the CPU should be assigned to the thread. This is because the thread may possibly be in lock-wait state.

In step S33, the scheduler 100 refers to the status-variable pointer corresponding to the thread selected in step S31, obtains the address of the status variable corresponding to the thread, and reads the value of the status variable. If necessary, the scheduler 100 checks the authenticity of the address, converts a logical address to a physical address, transfers pages of data to the main memory from a secondary memory, or performs a similar operation.

In step S34, the scheduler 100 determines whether the status variable read in step S33 is "0" or not. If Yes, the flow goes to step S38. In step S38, the scheduler 100 assigns the CPU to the thread selected in step S31, and executes this thread. This is because the thread is not in lock-wait state if the status variable is "0."

If No in step S34, that is, if the status variable is "1," indicating that the status was in lock-wait state during the preceding executing time, the flow goes to step S35. In step S35, the scheduler 100 directly refers to the lock variable. In step S36, the scheduler 100 determines, in accordance with the address set in the status variable, whether or not the shared resource is locked by any other thread.

If No in step S36, that is, if the shared resource has been released (lock variable=0), the flow goes to step S38, in which the scheduler 100 assigns the CPU to the thread selected in step S31 and executes this thread. If Yes in step S36, that is, if the shared resource is locked (lock variable= 1), the flow goes to step S37, in which the scheduler 100 selects another thread.

Then, the flow returns to step S32. Steps S33 to S37 are repeated until the thread to be executed is identified.

As stated above, the scheduler directly refers to the lock variable for which the thread is waiting. If the lock has been released, the scheduler assigns the CPU to the thread. Therefore, the possibility of spin-looping decreases and the CPU time is not used by the spin-looping idly.

Figure 9:
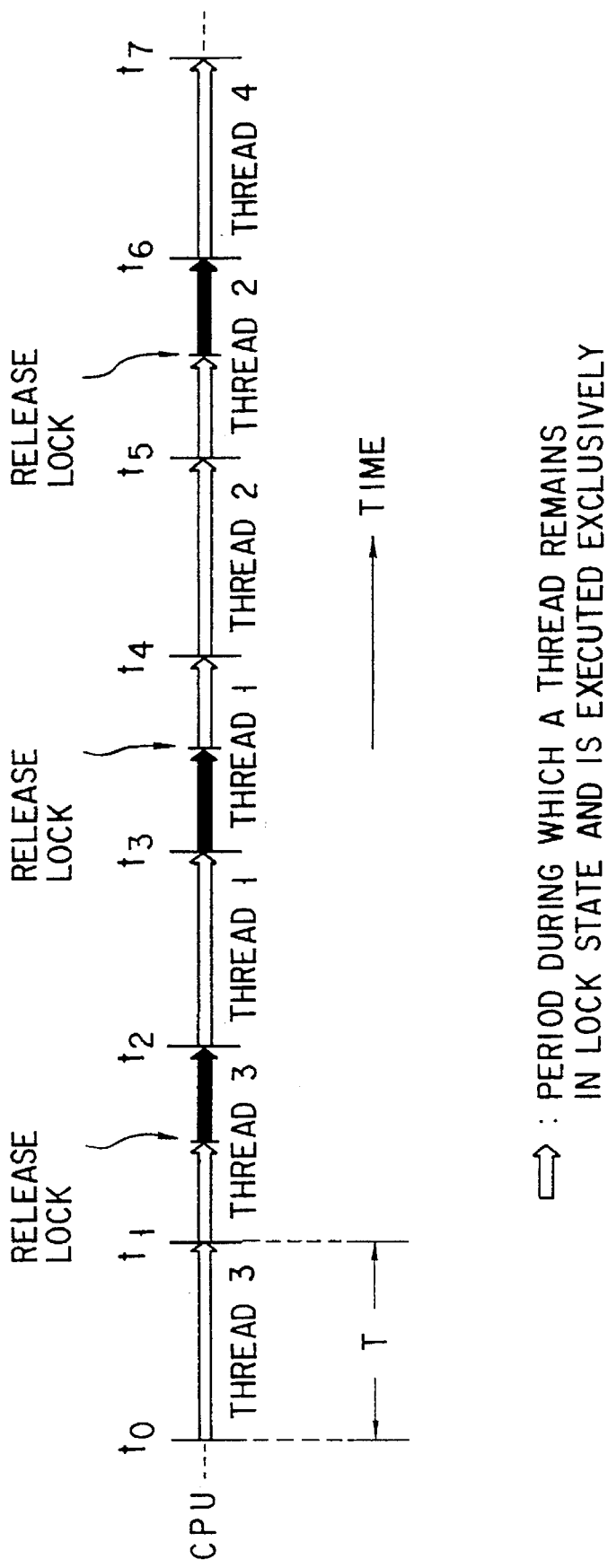
FIG. 9 is a diagram showing how the CPU incorporated in a single-processor system operates to accomplish the scheduling illustrated in FIG. 8.
Figure 10:
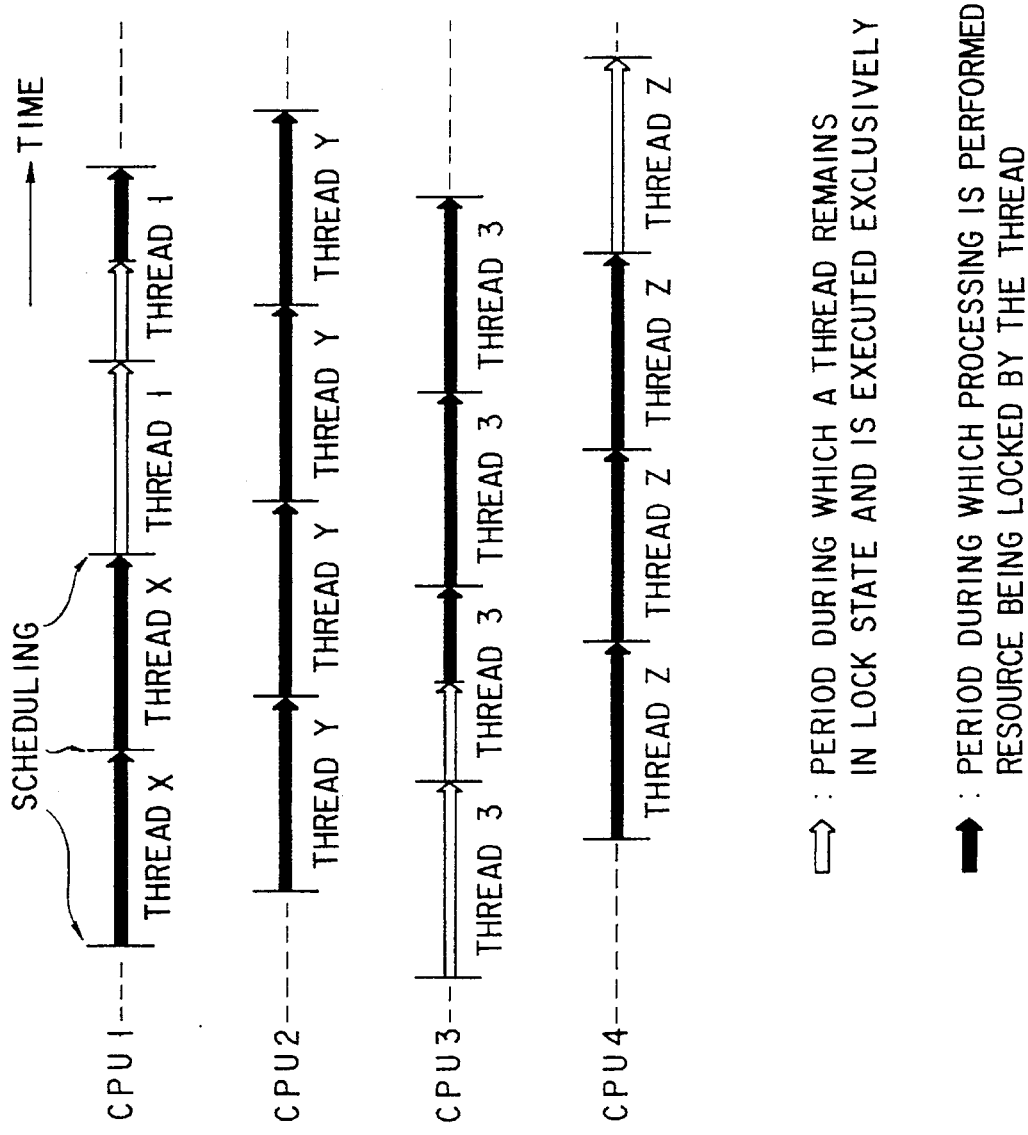
FIG. 10 is a diagram showing how the CPUs incorporated in a multi-processor system operates to accomplish the scheduling illustrated in FIG. 8.
Figure 15:
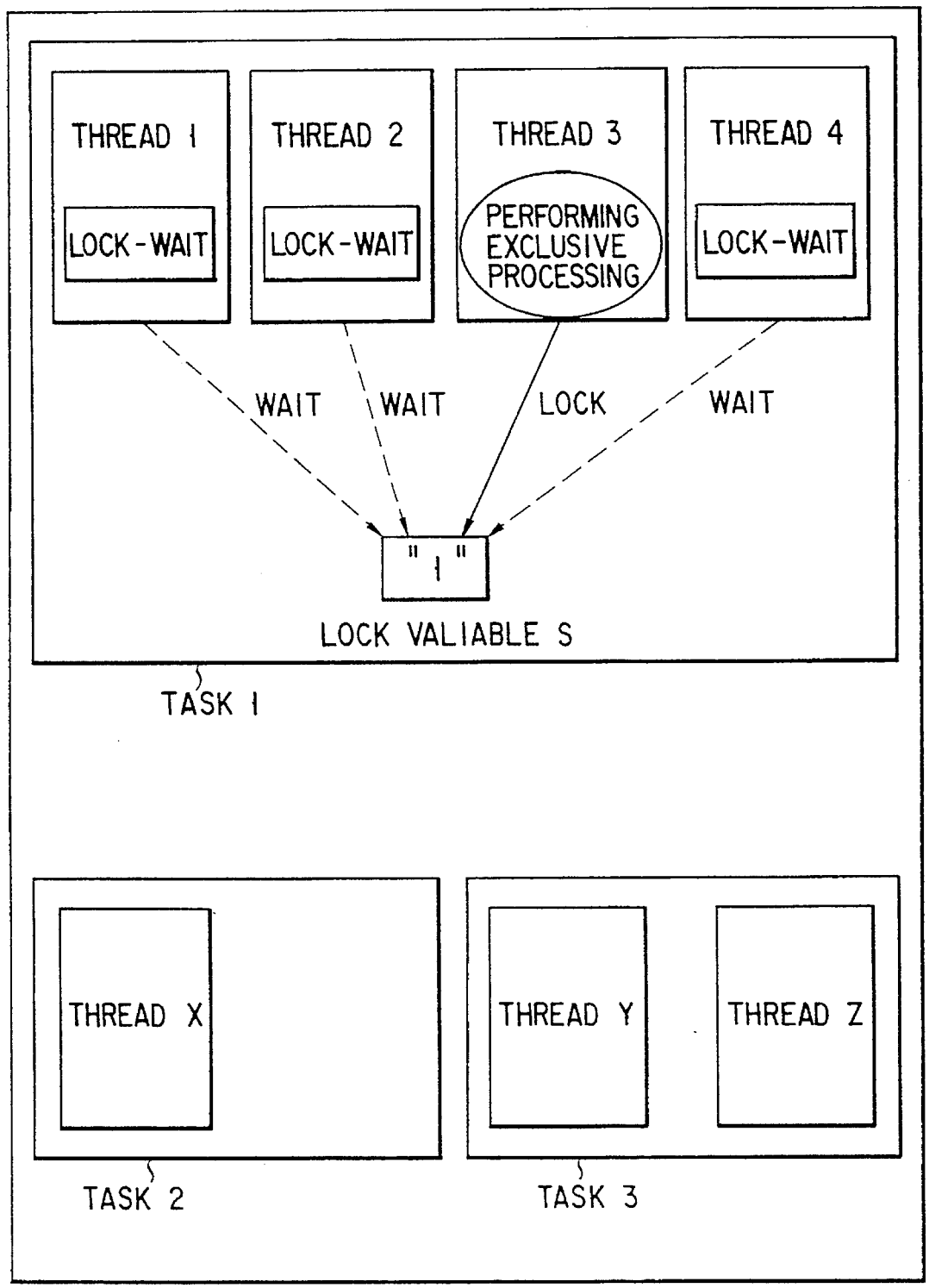
FIG. 15 is a block diagram explaining the operation of a conventional scheduling system.
Figure 16:
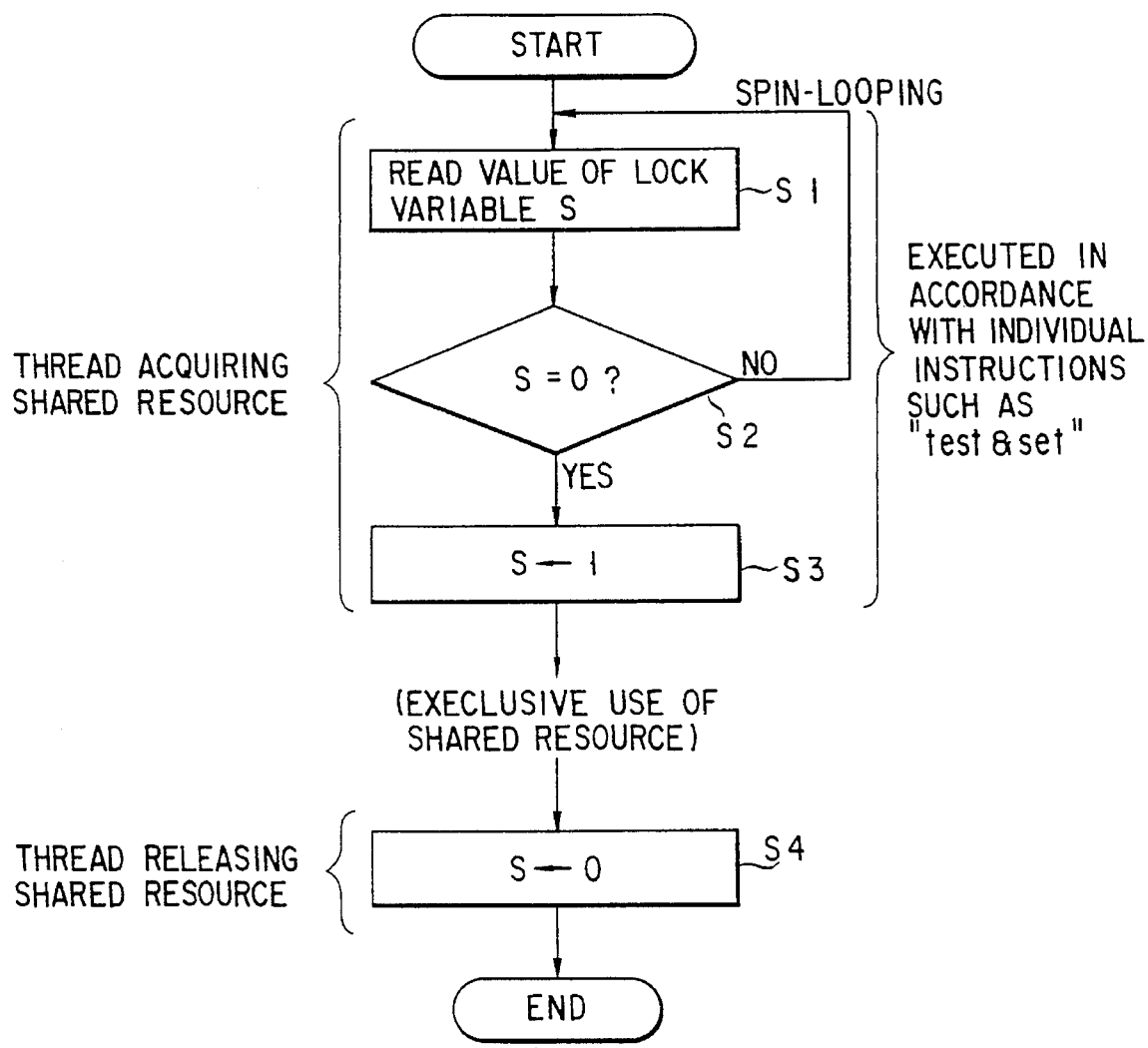
FIG. 16 is a flow chart explaining the mutual exclusion in the conventional system.
Figure 17:
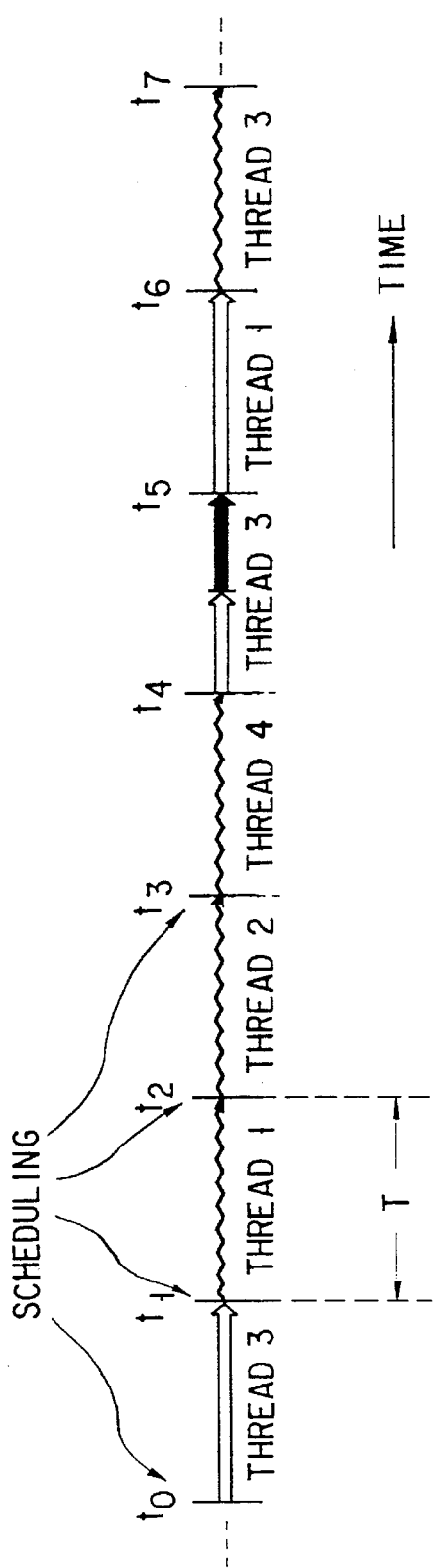
FIG. 17 is a diagram indicating how the CPU incorporated in a single-processor system operates to perform a conventional scheduling method.
Figure 18:
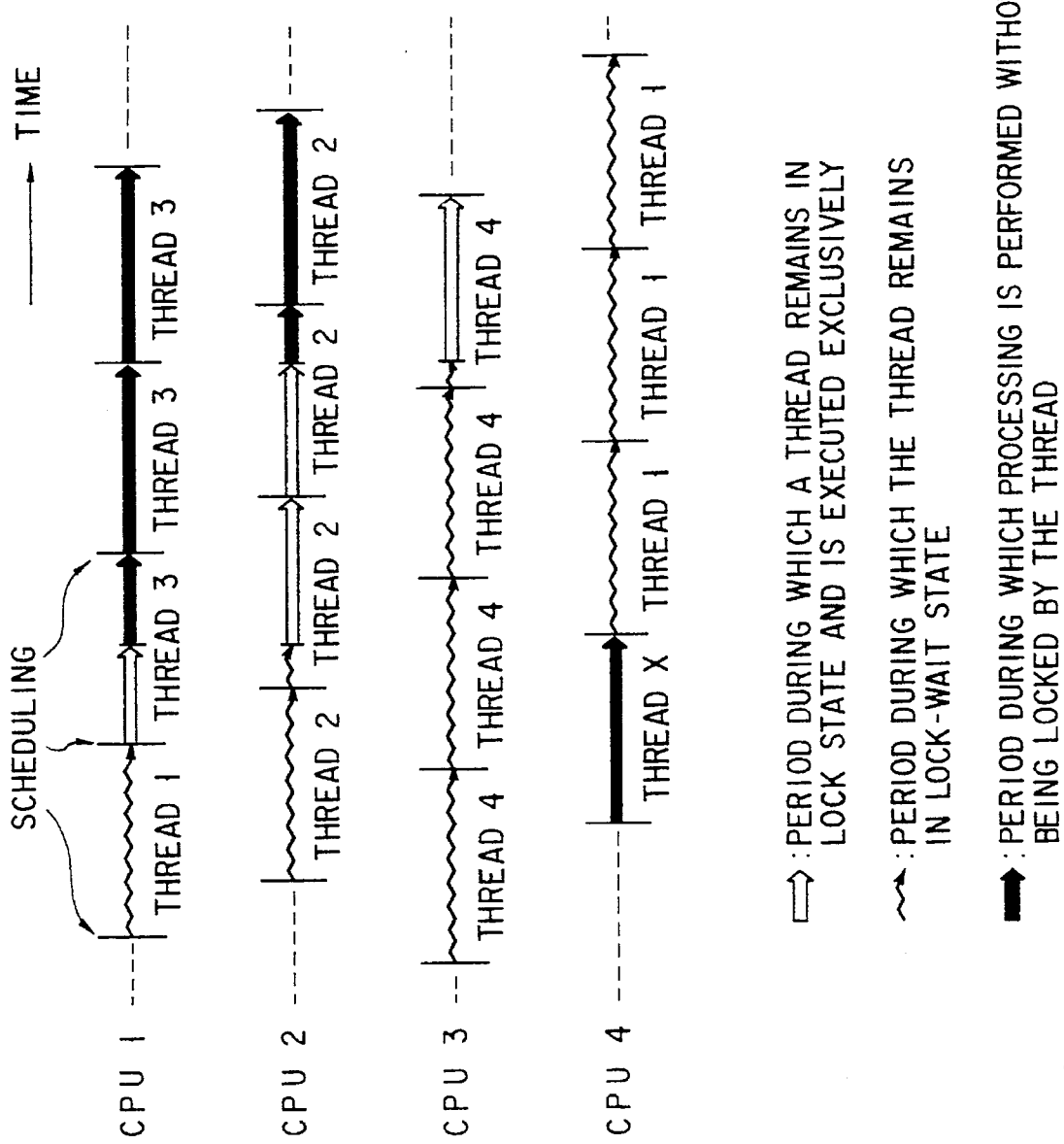
FIG. 18 is a diagram illustrating how the CPUs incorporated in a multi-processor system operates to perform the conventional scheduling method.

FIGS. 9 shows how the CPU incorporated in a single-processor system operates to accomplish the scheduling explained with reference to the flow chart of FIG. 8. FIG. 10 illustrates how the four CPUs incorporated in a multi-processor system operates to achieve the same scheduling. In both cases shown in FIGS. 9 and 10, thread 3 is in lock state, threads 1, 2, and 4 are in lock-wait state, and threads X, Y, and Z are in neither state.

In the single-processor system of FIG. 9, the thread 3 remains in lock state during the first executing time T (t0 to t1), and the CPU is allocated to the thread 3 during the second executing time T (t1 to t2). When the thread 3 is released from the lock state during the second executing time T, the CPU is immediately assigned to the thread 1 which has been in lock-wait state.

In the multi-possessor system of FIG. 10, the thread 3 which is in lock state and threads X, Y and Z which are in neither lock state or lock-wait state are executed prior to the other threads 1, 2, and 4 which remain in lock-wait state.

Since the CPU or CPUs are assigned to a thread or threads, which are not in lock-wait state, the spin-looping time can be reduced in both the single-processor system (FIG. 9) and the multi-processor system (FIG. 10).

The scheduling method according to the present invention can be applied also to a system of the type shown in FIG. 14 in which processes share a single memory and utilize the shared variable stored in the shared memory to achieve mutual exclusion. FIG. 11 shows a system of this type, wherein processes A and B use the shared variable stored in a shared memory to accomplish mutual exclusion.

As is shown in FIG. 11, the processes A and B have status variables A and B, respectively. The addresses of the status variables A and B are registered in two status-variable pointers incorporated in the kernel, respectively. While one of the processes remains in lock state, exclusively using a shared resource, the lock variable corresponding to the shared resource has the value of "0," and the status variable of the process has the value of "0." Meanwhile, the address of the lock variable of the other process held in lock-wait state is set in the status variable of the process. The status variable is declared and initialized, and the addresses of the status variables are registered into the status-variable pointers, in the same procedure as is illustrated in FIG. 4. Further, each process acquires the shared resources, essentially in the same manner as is illustrated in FIG. 6. Also, the scheduling procedure is identical to that procedure of FIG. 8, provided that the word "THREAD" used in FIG. 8 is read as "PROCESS."

In the embodiments described above, a CPU is not allocated to any thread or any process which is in lock-wait state. There is the possibility, however, that a thread or process locking the shared resource and executing it will release it in a relatively short time. Hence, the CPU may be assigned to another thread or process remaining in lock-wait state. This method effectively works in a multi-processor system which has a number of processors.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A computer system comprising:

a plurality of program units;

a shared resource which can be locked by any one of said program units;

a processor unit including at least one processor means for executing one of said program units;

control means for holding a status variable indicating that a corresponding one of said program units is in a lock-wait state when said program unit uses said shared resource, and for holding a lock variable indicating whether said shared resource is locked, said status variable holding an address of said lock variable when said corresponding program unit is in said lock-wait state; and scheduling means including:
  selecting means for selecting one of said program units as a candidate for allocation of said processor unit;
  a status-variable pointer for holding an address of said status variable held by said control means;
  means for allocating said processor unit to said program unit selected by said selecting means when said scheduling means does not have a status-variable pointer corresponding to said selected program unit;
  referring means for referring to said status-variable pointer to obtain said address of said status variable corresponding to said selected program unit when said scheduling means has a status-variable pointer corresponding to said selected program unit;

first referring means for referring to said status variable in accordance with said address obtained by said referring means;

means for allocating said processor unit to said selected program unit when said status variable referred to by said first referring means indicates that said selected program unit is not in a lock-wait state;

second referring means for referring to said lock variable corresponding to said address held in said status variable referred to by said first referring means when said selected program unit is in a lock-wait state; and means for allocating said processor unit to said selected program unit when said lock variable referred to by said second referring means indicates that said shared resource is unlocked.

2. The computer system according to claim 1, wherein said program units comprise one of threads and processes.

3. The computer system according to claim 1, wherein said processor unit includes a plurality of processor means, and said scheduling means allocates said processor means to said program units to execute said program units in parallel.

4. The computer system according to claim 1, wherein each of said program units lock said shared resource when said lock variable indicates that said shared resource in unlocked, said program unit remaining in said lock-wait state when said lock variable indicates that said shared resource is locked.

5. The computer system according to claim 1, wherein said control means includes means for changing said lock variable to a value indicating that said shared resource is locked and for changing said status variable to a value indicating that said program unit is not in lock-wait state when said program unit locks said shared resource.

6. A scheduling method for allocating a processor unit to a program unit in a computer system comprising a plurality of program units and a shared resource which can be locked by any one of the program units, said method comprising the steps of:

holding a status variable indicating that one of the program units is in a lock-wait state when using the shared resource, and for holding a lock variable indicating that the shared resource is locked when being used;

setting an address of the lock variable to the status variable of any program unit that is in a lock-wait state;

selecting one of the program units as a candidate for allocating the processor unit;

holding an address of the status variable in a scheduler;

allocating the processor unit to the selected program unit when the scheduler does not hold the address of the status variable corresponding to the selected program unit;

obtaining the address of the status variable which corresponds to the selected program unit when the scheduler holds the address of the status variable corresponding to the selected program unit;

referring to the status variable in accordance with the address obtained;

allocating the processor unit to the selected program unit when the status variable referred to indicates that the selected program unit is not in a lock-wait state;

referring to the lock variable corresponding to the address held in the status variable referred to; and allocating the processor unit to the selected program unit when the lock variable referred to indicates that the shared resource is unlocked.

* * * * *